United States Patent

Angermaier et al.

Patent Number: 5,566,090
Date of Patent: Oct. 15, 1996

[54] METHOD FOR DETECTING STRETCHES OF BAD ROAD

[75] Inventors: Anton Angermaier, Landshut; Maximilian Engl, Regensburg; Manfred Wier, Wenzenbach, all of Germany

[73] Assignee: Siemens Aktiengesellschaft, Munich, Germany

[21] Appl. No.: 170,025

[22] Filed: Dec. 20, 1993

[30] Foreign Application Priority Data

Dec. 18, 1992 [EP] European Pat. Off. ............ 92121627

[51] Int. Cl.6 .................................................. G05D 13/00
[52] U.S. Cl. ........................... 364/550; 340/444; 180/197
[58] Field of Search ................................... 340/444, 467, 340/441; 364/426.01, 426.02, 426.03, 550; 180/197, 195, 196

[56] References Cited

U.S. PATENT DOCUMENTS 4,093,939 6/1978 Mitchell .
4,615,410 10/1986 Hosaka ........................................ 340/441
5,056,360 10/1991 Dosdall et al. .
5,270,933 12/1993 Fennel et al. .......................... 364/426.01
5,311,433 5/1994 Igata et al. ............................ 364/426.01
5,335,178 8/1994 Schäfer et al. ........................ 364/426.02
5,365,441 11/1994 Ander et al. ................................ 180/197

FOREIGN PATENT DOCUMENTS 2497354 7/1982 France .
2238391 5/1991 United Kingdom .

Primary Examiner—Ellis B. Ramirez
Assistant Examiner—Thomas Peeso
Attorney, Agent, or Firm—Herbert L. Lerner; Laurence A. Greenberg

[57] ABSTRACT

A method for detecting bad stretches of road includes ascertaining a tripping variable representing acceleration of at least one wheel of a vehicle. A bad stretch of road is detected if the amount of the tripping variable exceeds a predeterminable limit value. The tripping variable is dependent on at least two segment times that the wheel needs to pass through associated angle segments.

11 Claims, 2 Drawing Sheets

FIG 2
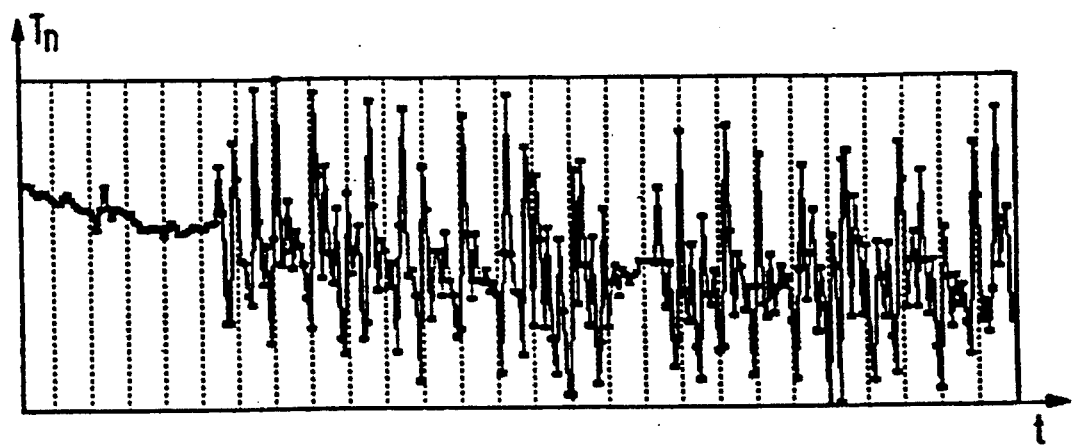
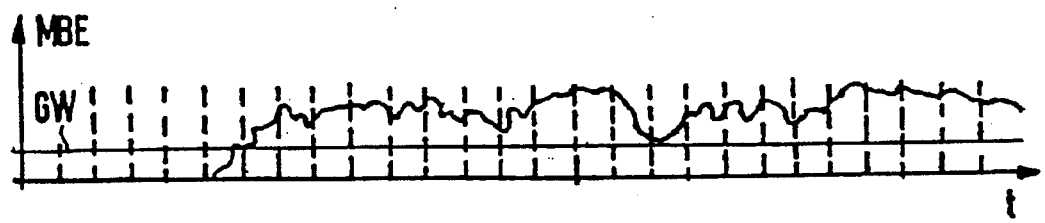

METHOD FOR DETECTING STRETCHES OF BAD ROAD

BACKGROUND OF THE INVENTION

1. Field of the Invention

The invention relates to a method for detecting stretches of bad road by evaluating the wheel rpm in a vehicle.

Detecting stretches of bad road is necessary in methods for detecting misfiring that monitor the vibration of the engine or check engine roughness caused by the fluctuating rotary speed of the crankshaft. The observed vibrations or fluctuations in the rotary speed are desirably due to the combustion process to be monitored and undesirably due to external factors affecting the vehicle, such as occur when driving over a rough stretch of road, from the attendant jarring of the vehicle and the crankshaft vibration induced.

2. Summary of the Invention

It is accordingly an object of the invention to provide a method for detecting stretches of bad road, which overcomes the hereinafore-mentioned disadvantages of the heretofore-known methods of this general type, which makes it possible to detect such a bad stretch of road with adequate certainty and which is attainable without major additional expense for hardware and software.

With the foregoing and other objects in view there is provided, in accordance with the invention, a method for detecting bad stretches of road, which comprises ascertaining a tripping variable representing acceleration of at least one wheel of a vehicle and being dependent on at least two segment times that the wheel needs to pass through associated angle segments, and detecting a bad stretch of road if the amount of the tripping variable exceeds a predeterminable limit value.

Therefore this object is attained by monitoring the wheel rpm of one or more wheels of a vehicle. The fluctuations in the wheel rpm are evaluated.

Information on the wheel rpm is often available anyway in vehicles equipped with electronic engine control, and particularly when an ABS system is present, so that detecting the wheel rpm does not require additional expenditure for hardware.

In the method of the invention, the fluctuations in the wheel rpm are now evaluated, that is the positive and negative accelerations of the wheel. This is based on the observation that the wheel accelerations caused by roughness of the underlying surface are multiple times greater than the accelerations that are physically possible as a result of normal engine operation. In other words, if such major acceleration is measured at the wheel, then it can be concluded that a bad stretch of road is involved.

In order to detect the wheel rpm, a transducer wheel provided with teeth is concentrically mounted on the applicable wheel, and this transducer wheel is scanned by a suitable sensor.

The times (segment times) that the wheel requires to span a certain angular range are then measured, that is the times within which a predeterminable number of teeth of the transducer wheel have moved past the scanning sensor in each case.

In accordance with a further mode of the invention, there is provided a method which comprises detecting the accelerations of the wheel, or the changes in the segment times, by comparing successive segment times with one another. If the difference exceeds a predeterminable limit value, then the conclusion of a bad stretch of road can be drawn.

Since individual unevennesses of the underlying surface have only a slight effect on the crankshaft vibration, or in other words the aforementioned methods for misfiring detection are not significantly disrupted, individual disturbances should be suppressed, and only stretches of bad road that have a certain length should be detected.

In accordance with an added mode of the invention, there is provided a method which comprises subjecting the amounts of the ascertained differences in segment times to averaging, for instance a sliding averaging, prior to being compared with the limit value.

Since the effects of the stretch of bad road on the vehicle are highly dependent on the vehicle speed, it is advantageous not to have the aforementioned limit value be constant but rather to take it as a function of vehicle speed from a performance graph. It is also possible to vary the observed segment size as a function of speed, or in other words to increase the segment size at higher speeds. This also lessens the load on the evaluating computer.

In accordance with an additional mode of the invention, there is provided a method which comprises precisely ascertaining a stretch of bad road by evaluating at least one left and one right wheel, so that a stretch of bad road can be detected even if the left wheels, for instance, are still on the smooth road while the vehicle is already located with its right wheels on the rough shoulder. This double evaluation again leads to a heavy load on the computer. In order to reduce it, it is possible to evaluate only one wheel or to switch back and forth between evaluating a left wheel and evaluating a right wheel within a time-slot pattern.

In accordance with a concomitant mode of the invention, there is provided a method which comprises utilizing a driven wheel or a non-driven wheel for evaluation purposes.

Other features which are considered as characteristic for the invention are set forth in the appended claims.

Although the invention is illustrated and described herein as embodied in a method for detecting stretches of bad road, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 2 includes two diagrams showing an example of a course of measured segment times and a variable, calculated from it and representing acceleration, for a case in which a vehicle is moving from a smooth road onto a bad stretch of road.

DESCRIPTION OF THE PREFERRED EMBODIMENTS

Figure 1:
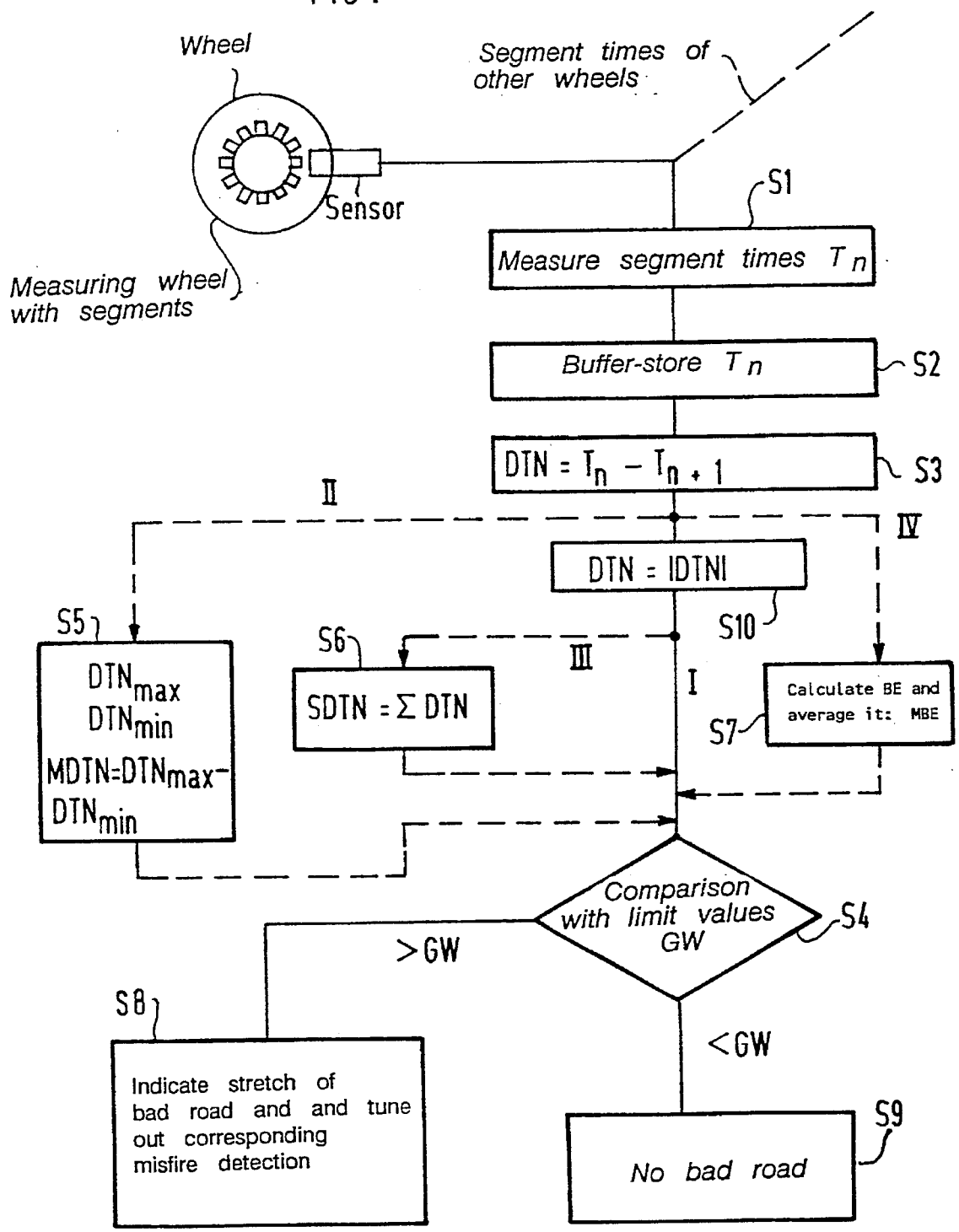
FIG. 1 is a diagrammatic view of a wheel, a sensor and a measuring wheel, as well as a flow chart illustrating the method of the invention.

Referring now to the figures of the drawing in detail and first, particularly, to FIG. 1 thereof, there is seen an illustration of an exemplary embodiment of the method of the invention (variant I), in solid lines. Three additional method variants (variants II, III and IV) in the further processing of calculated differences in segment times are shown in dashed lines.

First, in a method step S1, segment times $T_n$ are measured, that is the length of those times needed for the observed wheel to span certain angular ranges. The measurement is shown by way of example as performed by a transducer wheel with segments and by a sensor that scans these segments.

In a method step S2, the measured segment times $T_n$ are buffer-stored in memory.

Differences DTN are each calculated in a method step S3 from successive segment times $T_n$, $T_{n+1}$.

In the course of the method shown by solid lines (method variant I), the amount of the difference is formed in a method step S10, and this amount is compared in a method step S4 directly with a limit value GW.

Conversely, in the method variant II, in a method step S5, the maximum value ($DTN_{max}$) and the minimum value ($DTN_{min}$) of the differences ascertained during a predetermined period of time are determined, and a value MDTN= $|DTN_{max} - DTN_{min}|$ is formed from the maximum and minimum values. This value MDTN is then compared with the limit value GW again in the method step S4.

In the method variant III, once the amounts of the ascertained differences have been formed in the method step S10, these differences are added up in a method step S6 through a predeterminable number of segments. This total SDTN is then again compared in the method step S4 with the limit value GW.

In the method variant IV, a tripping variable BE representing the acceleration is ascertained from the segment times in a method step S7 in accordance with the following formula:

$$BE = \frac{T_n - T_{n-1}}{0.5 * (T_n + T_{n+1})},$$

in which $T_n$ is the time that the wheel requires to span the angular segment n; and $T_{n+1}$ is the time that the wheel needs to span the equally large angular segment n+1.

These tripping variables are compared in the method step S4 with the limit value GW again, either directly (BE) or after they have additionally been subjected to a sliding averaging (MBE), for instance in accordance with the following formula:

$$MBE_n = MBE_{n-1} + MITKO*(BE_n - MBE_{n-1}).$$

If the value ascertained by one of the four methods is larger in amount than the limit value GW, then in a method step S8 a bad stretch of road is detected, and the corresponding methods for detecting misfiring are tuned out.

However, if the ascertained value is less than the limit value GW, then no stretch of bad road is detected, and control provisions do not ensue (in a method step S9).

In FIG. 2, the segment times $T_n$ measured in chronological succession at the wheel are plotted over the time t in the upper half of the drawing. The vehicle is initially (left-hand time range) on a smooth road. The fluctuations in the segment times $t_n$ are relatively slight. The vehicle then moves onto a bad stretch of road (right-hand time range). The segment times $T_n$ begin to fluctuate strongly in duration.

In the lower half of FIG. 2, the tripping variable (BE) representing the acceleration of the wheel and being calculated from the measured segment times $T_n$, is then plotted as an example. It is calculated, as described above, in accordance with the formula:

$$BE = \frac{T_n - T_{n-1}}{0.5 * (T_n + T_{n+1})}$$

Then it is subjected to a sliding averaging (MBE).

In the range on the left, that is as long as the vehicle is moving on a smooth road, this variable MBE is virtually zero.

However, as soon as the vehicle moves onto the poor road (time range on the right), this variable MBE increases perceptibly, with fluctuations. These fluctuations then exceed in amount a limit value GW plotted in this case as a horizontal line, so that this poor stretch of road is reliably detected.

We claim:

1. In a vehicle traveling on surfaces defined as good and bad stretches of road, respectively, the vehicle having wheels and angle segments associated therewith, a method for detecting bad stretches of road, which comprises:

defining a limit value representing an amount of acceleration of a wheel of the vehicle, ascertaining a tripping variable representing acceleration of at least one of the wheels of the vehicle and being dependent on at least two segment times that the wheel needs to pass through associated angle segments, comparing the tripping variable obtained in the ascertaining step with the limit value defined in the defining step; and determining that the vehicle is traveling on a bad stretch of road if the amount of the tripping variable exceeds the limit value.

2. The method according to claim 1, which comprises determining the tripping variable as an amount of a difference of successive segment times.

3. The method according to claim 1, which comprises ascertaining the tripping variable by adding together amounts of the differences of successive segment times formed over a predeterminable number of segments.

4. The method according to claim 1, which comprises ascertaining the tripping variable by:

forming differences between successive segment times, ascertaining a maximum value and a minimum value from the differences ascertained during a predeterminable period of time, and forming another difference from these two values.

5. The method according to claim 1, which comprises ascertaining the tripping variable BE in accordance with the formula:

$$BE = \frac{T_n - T_{n-1}}{0.5 * (T_n + T_{n+1})},$$

in which $T_n$ is a time that the wheel requires to span an angular segment n; and $T_{n+1}$ is a time that the wheel needs to span an equally large angular segment n+1.

6. The method according to claim 5, which comprises subjecting the tripping variable, prior to comparison with the limit value, to a sliding averaging MBE in accordance with the formula:

$$MBE_n = MBE_{n-1} + MITKO*(BE_n - MBE_{n-1}).$$

7. The method according to claim 1, which comprises measuring the segment times in alternation at a wheel on the left side of the vehicle and at a wheel on the right side of the vehicle.

8. The method according to claim 1, which comprises selecting a driven wheel as the evaluated wheel.

9. The method according to claim 1, which comprises making the limit value speed-dependent.

10. The method according to claim 1, which comprises making the size of the angle segments speed-dependent.

11. The method according to claim 1, which comprises making the limit value and the size of the angle segments speed-dependent.

\* \* \* \* \*